(12) United States Patent
Tapson

(10) Patent No.: US 7,844,052 B2
(45) Date of Patent: Nov. 30, 2010

(54) ENCODING AND DETECTING APPARATUS

(75) Inventor: Daniel Warren Tapson, London (GB)

(73) Assignee: Sony United Kingdom Limited, Weybridge (GB)

( * ) Notice: Subject to any disclaimer, the term of this patent is extended or adjusted under 35 U.S.C. 154(b) by 1430 days.

(21) Appl. No.: 11/263,373

(22) Filed: Oct. 31, 2005

(65) Prior Publication Data
US 2007/0098158 A1 May 3, 2007

(30) Foreign Application Priority Data
Nov. 1, 2004 (GB) .................................. 0424225.1

(51) Int. Cl.
*H04K 1/04* (2006.01)
(52) U.S. Cl. ........................................................ 380/37
(58) Field of Classification Search ................. 713/176, 713/177, 180; 380/37, 44, 46; 726/27, 32
See application file for complete search history.

(56) References Cited

U.S. PATENT DOCUMENTS

| 6,052,786 | A | * | 4/2000 | Tsuchida | 726/14 |
| 6,272,634 | B1 | | 8/2001 | Tewfik et al. | |
| 6,959,090 | B1 | * | 10/2005 | Alve et al. | 380/277 |
| 2004/0059933 | A1 | * | 3/2004 | Levy | 713/200 |
| 2006/0237528 | A1 | * | 10/2006 | Bishop et al. | 235/380 |

FOREIGN PATENT DOCUMENTS

EP    1 324 263    5/2004

OTHER PUBLICATIONS

U.S. Appl. No. 12/301,563, filed Nov. 19, 2008, Russell, et al.
U.S. Appl. No. 12/303,120, filed Dec. 2, 2008, Russell, et al.

* cited by examiner

*Primary Examiner*—Beemnet W Dada
(74) *Attorney, Agent, or Firm*—Oblon, Spivak, McClelland, Maier & Neustadt, L.L.P.

(57) ABSTRACT

An encoding data processing apparatus is arranged to generate a marked copy of an item of material by introducing at least one code word into a copy of the material item, the code word being arranged to identify a payload data word. The encoding apparatus comprises an encryption circuit operable to receive a payload encryption key and to receive the payload data word, and to encrypt the payload data word using the payload encryption key. A pseudo random number generator receives the encrypted payload data and a finger print key and generates the code word having a plurality of code word coefficients using the encrypted payload as a seed for the pseudo random number generator and the finger print key. A combiner combines the code word with the material to form the marked copy of the material item. The encoding apparatus may form part of a media terminal for marking material items with the code words, when the material items are to be reproduced. A more secure system for reproducing watermarked material can be formed using the encoding apparatus in which the payload data is encrypted and used as a seed for the pseudo random number generator with the finger print key to generate the code word coefficients. The code word is thereby generated from a finger print key and an encrypted seed, which provides an improved level of security against an attack aimed at compromising correction detection of a code word in a mark material item.

23 Claims, 11 Drawing Sheets

Target contrast detection threshold vs. marker contrast

ENCODING AND DETECTING APPARATUS

FIELD OF INVENTION

The present invention relates to encoding data processing apparatus and methods for generating marked copies of material items by introducing code words into copies of the material items.

Correspondingly, the present invention also relates to detecting data processing apparatus and methods operable to detect code words, which may be present in marked material items.

The present invention also relates to media terminals for generating marked copies of material items for reproduction. In some applications the media terminal may form part of a digital cinema projector.

BACKGROUND OF THE INVENTION

Generally, a technique for embedding data in material to the effect that the embedded data is perceptible or imperceptible is referred to as watermarking. Code words are applied to copies of material items for the purpose of identifying the copy of the material item or for conveying data represented by the code words. In some applications, watermarking can provide, therefore, a facility for identifying a recipient of a particular copy of the material.

A process in which information is embedded in material for the purpose of identifying a specific copy of the material is referred to as finger printing. A code word, which identifies the material, is combined with the material in such a way that, as far as possible, the code word is imperceptible in the material. As such, if the material is copied or used in a way, which is inconsistent with the wishes of the owner, distributor or other rights holder of the material, the material copy can be identified from the code word and take appropriate action. The code word is therefore used to convey a payload data word, which can uniquely identify the material copy.

In co-pending UK patent application number 0327854.6 an encoding data processor is disclosed for application to for example digital cinema in which payload data having two or more fields is represented by watermarking an image with one or more code words. Each value of a first field of a payload data word is associated with a first code word, and each value of a second or subsequent data field is represented by a second code word, which is selected in dependence upon the value of the first data field. As such a detected code word can be used to identify one of a plurality of sub-sets into which the data words are divided, each data word in the sub-set having the same value in the first field. A second or subsequent field of the data word from the sub-set can be then identified by detecting a second code word from the material item. The second code word identifies a value in the second data field as well as the value of the first data field.

The first and second fields can be assigned to different associated parameters such as for example address parameters. The first field could therefore identify the country of distribution of the material, whereas the second field could identify a particular distribution outlet within the country. A watermarking or finger printing system can be formed for identifying a point of distribution of copies of video material.

Generally, it is desirable to reduce a likelihood of an embedded code word being detectable. If a code word is detected, the payload data word may be determined. As a result the watermarking system could be compromised by attackers wishing to remove a code word or include a false code word to disrupt detection of the payload data.

SUMMARY OF INVENTION

An object of the present invention is to provide a watermarking system with improved security for information conveyed by a watermark code word embedded in material.

According to the present invention there is provided an encoding data processing apparatus which is arranged to generate a marked copy of an item of material by introducing a code word into a copy of the material item, the code word being uniquely associated with a payload data word. The encoding data processing apparatus comprises an encryption circuit operable to receive a payload encryption key and to receive the payload data word, and to encrypt the payload data word using the payload encryption key. A pseudo random number generator receives the encrypted payload data and a finger print key and generates the code word having a plurality of code word coefficients using the encrypted payload as a seed for the pseudo random number generator and the finger print key. A combiner combines the code word with the material to form the marked copy of the material item.

The encoding apparatus may form part of a media terminal for marking material items with the code words, when the material items are to be reproduced. A more secure watermarking system can be formed using the encoding apparatus in which the payload data is encrypted and used as a seed for a pseudo random number generator to generate the code word coefficients with the finger print key. The code word is thereby generated from a finger print key and an encrypted payload data word as a seed, which provides an improved level of security, by making detection of the payload data word by an unauthorised attacker more difficult.

According to an aspect of the present invention there is provided a system for providing secure marking of an information material item for reproduction, the system comprising a secure server operable to provide a finger print key and a payload encryption key, via a secure link, and a media terminal. The media terminal is operable to form a marked copy of the material item by introducing a code word into a copy of the material item, the code word being uniquely associated with a payload data word. The media terminal comprises a secure interface operable to receive the finger print key, and the payload encryption key, and an encoding data processing apparatus. The encoding data processing apparatus comprises an encryption circuit operable to receive the payload data word, and to encrypt the payload data word using the payload encryption key, and a pseudo random number generator and a combiner. The pseudo random number generator is operable to receive the encrypted payload data and to generate the code word having a plurality of code word coefficients using the encrypted payload as a seed for the pseudo random number generator and the finger print key. The combiner is operable to combine the code word with the material item to form the marked copy of the material item. The secure interface includes an encryption processor operable to encrypt and de-crypt the finger print key and the payload encryption key received from the secure server using a public key and a secret key pair, the encryption and the decryption providing the secure link.

Embodiments of the present invention can provide an improved system for securely watermarking material items for reproduction. The improvement is provided by arranging for a finger print key and a payload encryption key which are required to generate code words for marking the material to be securely distributed to a media terminal. The media terminal forms the marked material items by generating code words and combining the code words with a reproduced original version of the material items. The finger print key and the payload encryption key are distributed from a secure server. The secure server communicates the finger print key and the payload encryption key via a secure link. The secure link is formed by encrypting the finger print key and the payload encryption key with a public encryption key and using a secret encryption key paired with the public key to decrypt the keys. The finger print key and the payload encryption key are therefore not held at the material server until required, thereby reducing a vulnerability of the system because the keys may be more vulnerable to discovery, if held remotely in the media terminal.

Various further aspects and features of the present invention are defined in the appended claims. These aspects include a method of generating a marked copy of an image and a method of detecting a payload in a marked image.

BRIEF DESCRIPTION OF THE DRAWINGS

Embodiments of the present invention will now be described by way of example only with reference to the accompanying drawings, where like parts are provided with corresponding reference numerals, and in which.

DESCRIPTION OF EXAMPLE EMBODIMENTS

General Watermarking Encoder

Figure 1:
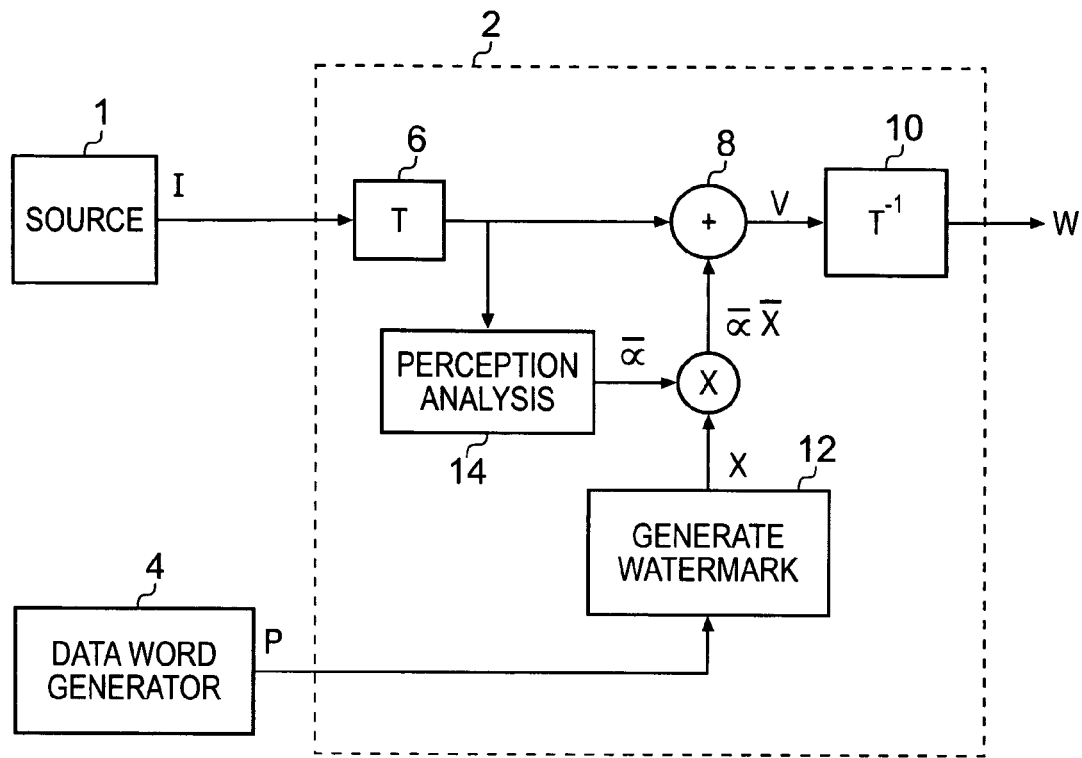
FIG. 1 is a schematic block diagram of a known encoding apparatus for combining an image with a code word to form a marked version of the image.

An example of a known encoding data processing apparatus, which is operable to generate watermarked images by combining or embedding a code word with the images, is shown in FIG. 1. The known encoding data processing apparatus shown in FIG. 1 is disclosed in European patent application EP 1324263 A. In FIG. 1 images I are generated by a source 1 and fed to an encoder 2 which is arranged to combine payload data words P generated by a data word generator 4 so that at the output of the encoder 2 a marked copy W of the images I is formed. As shown in FIG. 1, the encoder 2 includes a transform processor 6, a combiner 8 and an inverse transform processor 10. The encoder also includes a watermark code word generator 12 generates a code word or code words X having a plurality of code word coefficients. Each code word represents a payload data word P or a part of the data word P generated by the data word generator 4. The transform processor 6 receives the source image I and performs a transform such as a Discrete Wavelet Transform (DWT) or a Discrete Cosine Transform (DCT) to convert the image into the transform domain. A perceptual image analyser 14 is arranged to receive a copy of the transform domain image I which is to be marked with the code word X and generates a weighting factor $\alpha$ for each part of the image with which the code word coefficients are to be combined. For example, each luminance component of the image pixels may be arranged to carry one or more of the code word coefficients. The weighting factors $\alpha$ are therefore adapted to the effect that the weight of the code word coefficients is made as high as possible, to increase a likelihood of detection of the code word whilst as far as possible reducing a likelihood of the effect of the code word being perceived by the human eye when the code word is combined with the image I. A strength adaptor 14 is therefore arranged to combine the weighting factors $\alpha$ with the code word coefficients. The weighted code word coefficients are then combined with the image in the transform domain by the combiner 8 and the marked copy of the image W is then formed by the inverse transform processor 10 by forming an inverse transform on the marked transform domain image V.

In the following description the term "samples" will be used to refer to discrete samples from which an image is comprised. The samples may be luminance samples of the image, which is otherwise, produce from the image pixels. Therefore, where appropriate the term samples and pixels are inter-changeable.

Video images are one example of material, which can be protected by embedding a digital code word. Other examples of material, which can be protected by embedding a code word, include software programs, digital documents (optionally reproduced on paper or other media), music, audio signals and any other information-bearing signal.

Watermark Encoder

Figure 2:
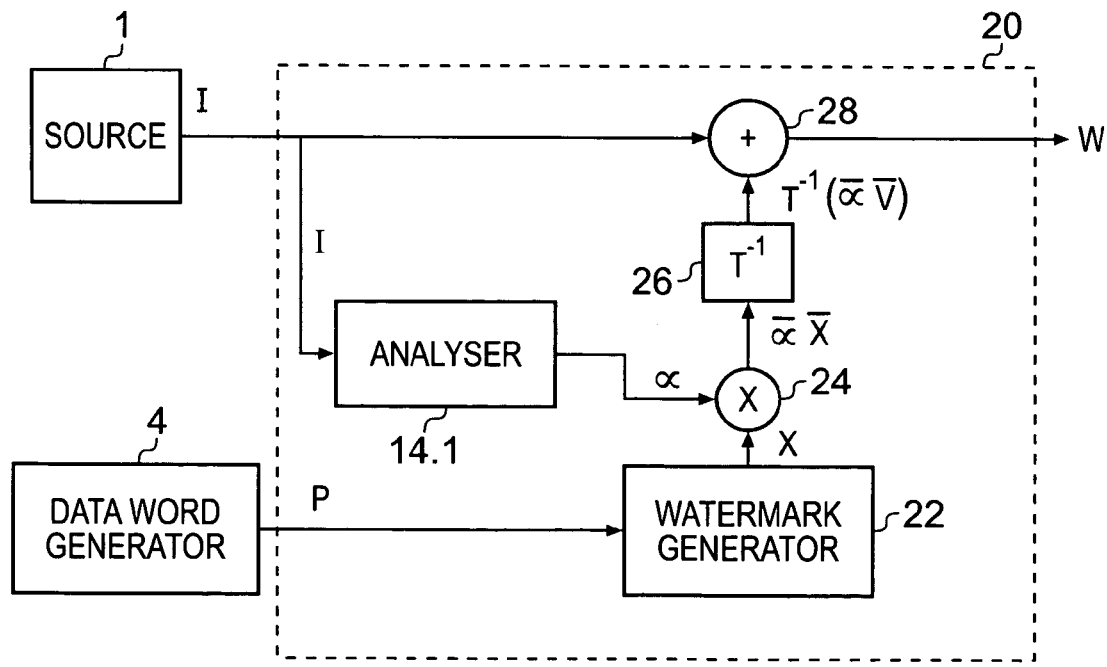
FIG. 2 is a schematic block diagram of an encoding apparatus for combining an image with a code word according to the present technique.

An encoding data processing apparatus, which operates in accordance with the present technique, is shown in FIG. 2. Unlike the conventional arrangement shown in FIG. 1, the encoding data processing apparatus shown in FIG. 2 is arranged to combine the code word with the image to form the marked copy in the base band domain. The encoder 20 shown in FIG. 2 includes a code word generator 22 which arranges the code word coefficients into a form corresponding to a transform domain representation of the image. Weighting factors are then generated by a perceptual analyser 14.1 in accordance with a relative ability of the image to carry the code word coefficients with a maximum strength whilst minimising a risk of the code word being perceivable when added to the image I. The weighting factors are received by a strength adaptor 24 and combined with the code word coefficients to form weighted code word coefficients. The weighted code word coefficients are then transformed into the base band domain by an inverse transform processor 26, which performs an inverse transform on the code word. The base-band domain code word is then combined with the base band domain image by a combiner 28 to form the marked copy of the image W.

According to one example of the present technique, the transform domain representation includes either a temporal and/or spatial down-sampled representation with respect to a sampling rate of the base band domain image. The code word is therefore arranged in a form or treated as if the code word were in a form in which it had been spatially and/or temporally down-sampled with respect to the base band version. As such the inverse transform processor is arranged to temporally and/or spatially up-sample the code word coefficients to form a base band version of the code word, in which form the code word is combined with the base band image I to form the marked copy of the image W.

In some embodiments utilising the present technique, the transform domain representation of the code word may include a Discrete Cosine Transform (DCT), a Fourier Transform or a Discrete Wavelet Transform. For example, the code word could be formed as if in a DCT domain, so that the inverse transform processor 26 may be arranged to perform an inverse DCT on the code word coefficients before being spatially and/or temporally up-sampled. Accordingly, contributions from the code word coefficients may be localised within certain preferred frequency bands of the image.

Figure 3:
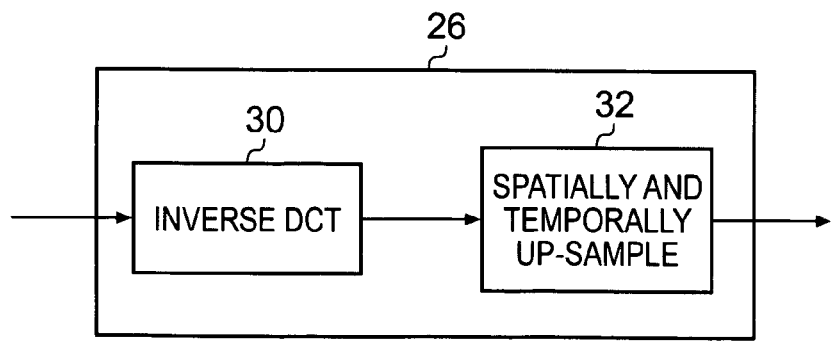
FIG. 3 is a schematic block diagram of an inverse transform processor forming part of the apparatus shown in FIG. 2.

An example of an inverse transform processor 26 is shown in FIG. 3 in more detail. As shown in FIG. 3, the inverse transform processor 26 includes an inverse DCT transformer 30 which performs an inverse DCT on the down-sampled code word as formed into a DCT domain image. An up-sampling processor 32 is then operable to spatially and/or temporally up-sample the code word to provide a sampling rate which corresponds to that of the base band domain image into which the code word is to be introduced.

Embodiments which utilise the present technique provide an advantage with respect to conventional arrangements in that generation and strength adaptation of the code word coefficients is performed at a lower rate and lower bandwidth with respect to the base band image. For an example where the image represents frames of high definition television pictures or digital cinema images in which the number of pixels in an image frames comprises 4096×2048 pixels (8×10$^6$ pixels), the code words for combining with the base band image can be formed in the transform domain as 256×128 pixel frames. Correspondingly, the weighting factors generated by the perceptual analyser 14.1 can be 256×128 factors per frame. The strength adapter 24 therefore can perform the combination of the code word coefficients and the weighting factors at a relatively low rate requiring, for example, only 256×128 multiplications as opposed to 4096×2048 multiplications which would be required if the code word coefficients were combined with the image in the base band domain. As explained above, conventional arrangements such as that shown in FIG. 1, combine the code word with the image in the transform domain. As such, the transform processor 6 would be required to perform a transform, such as a DCT on an image frame comprising 4096×2048 pixels, and then a corresponding inverse transform. As can be appreciated, this would represent a significant amount of processing power in terms of a number of calculations per second. Embodiments utilising the present technique therefore reduce an amount of processing required and can therefore be implemented using a substantially reduced number of computations per second, because the transform domain includes a down-sampled representation thereby allowing a less expensive implementation.

Image Perception Analyser

Figure 4:
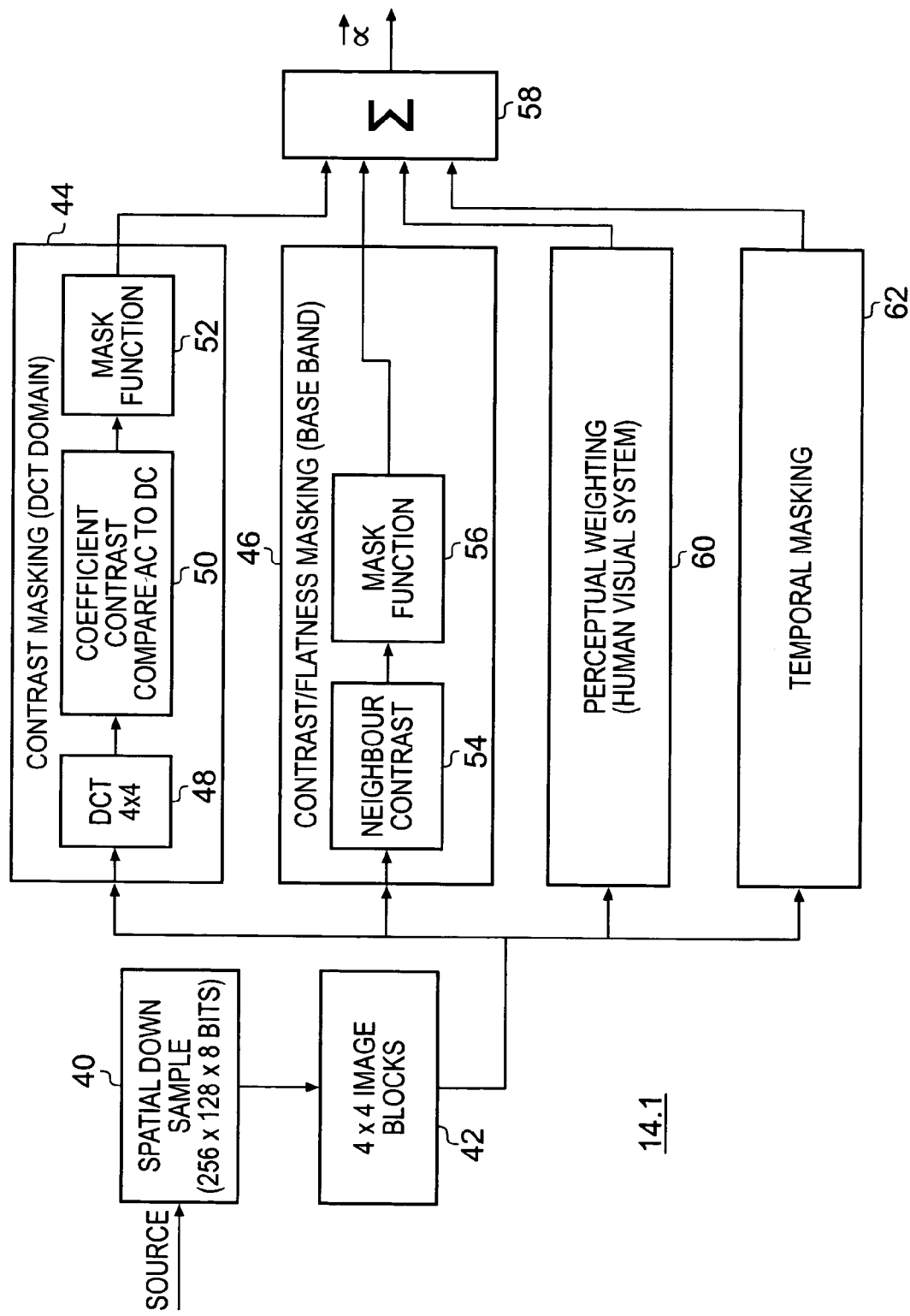
FIG. 4 is a schematic block diagram of a perceptual image analyser which forms part of the encoding apparatus of FIG. 2.

As explained above, an image perception analyser 14 is arranged to calculate the weighting factors for adapting the code word coefficients in accordance with an ability of the image, or parts thereof to mask the visual presence of contributions from the code word coefficients. The effect of the code word should be therefore, as far as possible be substantially imperceptible in the image. An example of an image perception analyser utilising the present technique is shown in FIG. 4. In FIG. 4 the signal representation of the image is received from the source by a spatial domain down sampler 40, which spatially down-samples the received images. According to one example in which the images are formed from images generated according to the digital cinema standard, the source images comprise 4096×2048 pixels each pixel having 12 bit samples. For this example the spatial down sampler may down-sample the images to 256×128 pixels each having 8 bit samples. The down-sampling may be different to the down-sampled representation in which the code word is formed for combining with the image. The spatially down sampled images are then received by an image divider, which is arranged to divide the down-sampled image into 4×4 image blocks. The down sampled image is then received from the image divider 42 by at least a contrast masking engine 44 and a smoothness making engine 46.

Figure 5:
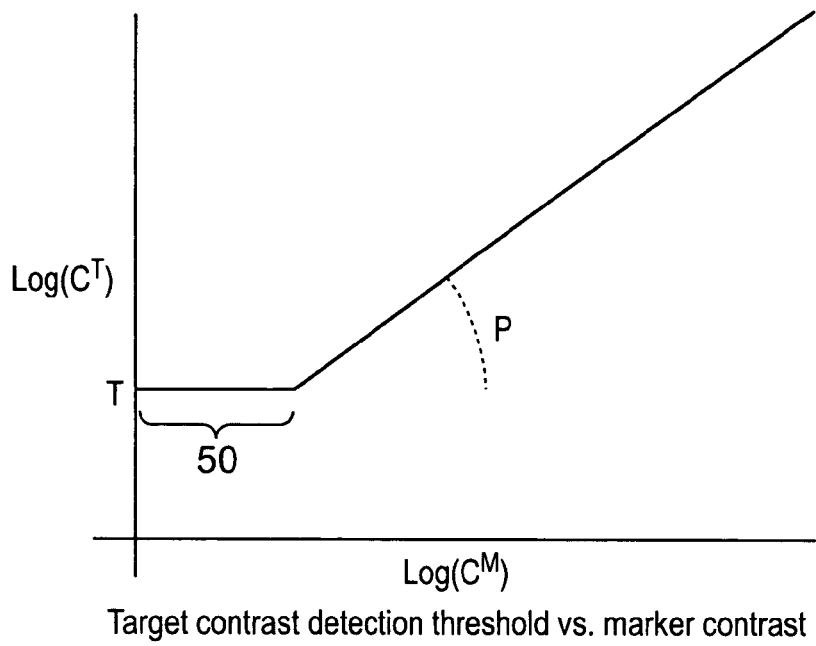
FIG. 5 is a graphical representation of a relative contrast measure of a code word coefficient with respect to a relative contrast measure of an image block to which the code word coefficient is to be added.

The contrast-masking engine 44 includes a DCT transformer 48, which is arranged to transform 4×4 blocks of pixels into the DCT transform domain. A coefficient contrast comparator 50 then receives the transform domain image. The contrast comparator compares the DC value of the DCT coefficients with the AC value of the DCT coefficients within each 4×4 pixel block to form a relative contrast measure for the DCT coefficient concerned. From a predetermined relationship between a relative contrast measure which would be produced by the code word coefficient with respect to a relative contrast measure of the image block which would mask this code word coefficient, a maximum allowable contrast is determined for the relative contrast measure of the DCT coefficient concerned. A weighting factor is then calculated by scaling the maximum allowable contrast measure with the value of the DCT coefficient concerned. This process is explained in more detail in the following paragraphs:

The contrast-masking engine 44 applies a technique referred to as contrast masking in which a target signal T, which in this case is the watermark code word is hidden by another signal M, which is referred to as the masker, which in this case is the image. According to the present technique, the image signal is tested to determine a relative ability of the image to mask the watermark code word coefficient or coefficients. The masking ability is assessed in accordance with frequency sensitivity in that the human visual sensitivity differs for different spatial frequency and orientation. The contrast masking ability is greatest when the masking signal and the target signal are spatially coincident and are of similar frequencies. For this reason, the masking of each watermark code word coefficient is considered with respect to corresponding DCT coefficients of the source image. The contrast of the source AC coefficient u, v in an image block b of the source S to the ratio of the DC value is defined as follows:

$$C_{b,u,v}^S = D_{b,u,v}^S / D_{b,0,0}^S$$

Where $D_{b,u,v}$ are the u, v coefficients of the block b of the DCT transform of the source image. The human visual sensitivity threshold of a target of contrast $C_T$ in the presence of a masking image of contrast $C_M$ is modelled using a predetermined perception function. An example of such a perception function is as illustrated in FIG. 5. As can be seen for the example of FIG. 5 in a flat region of the function 50, for small values of contrast of the masking image $C_M$ the maximum value of the target contrast $C_T$ below which the watermark code word coefficients can be added is constant. According to the function illustrated in FIG. 5, at a threshold $T_{u,v}$ the log contrast of the target rises linearly with respect to the log of the value of the masking contrast $C_M$. The value of the threshold is different for each of fifteen AC coefficients, higher spatial frequencies having higher threshold values. The values of the threshold $T_{u,v}$ and an exponent value $P_{u,v}$ illustrated in FIG. 5 are determined empirically. Applying the function illustrated in FIG. 5, a maximum allowable watermark coefficient value, which can be applied for a given data block $D_{b,u,v}$ is defined by the equation below:

$$\alpha_{u,v} = D_{b,u,v}^W = T_{u,v} D_{b,0,0}^S \max(1, [D_{b,u,v}^S / T_{u,v} D_{b,0,0}^S]^{P_{u,v}})$$

Accordingly, the weighting value $\alpha_{u,v}$ is calculated for each image data block $D_{b,u,v}$ to ensure that the coefficient value does not exceed the maximum allowable value calculated above. Effectively, therefore the weighting factor is calculated by determining the maximum allowable contrast caused by the code word coefficient determined from a ratio of the AC coefficient to the DC coefficient of the coefficient in the DCT domain. The weighting factor is calculated by scaling the maximum allowable contrast with the DC value of the DCT domain coefficient of the code word.

As mentioned above, the spatially down sampled image is also received from the image divider 42 by the smoothness compensation engine 46. The smoothness compensation engine 46 is provided to compensate for some limitations of the contrast masking engine 44. The contrast-masking engine 44 can operate well for smoothly varying signals. However edges in images can place energy in many of the coefficients of a DCT block and can lead to an overestimate of the maximum allowable watermark code word coefficient. For this reason the smoothness compensation engine 46 calculates a correction factor for each DCT block which varies between zero and one [0, 1] to an effect of reducing the weighting value $\alpha_{u,v}$ in the presence of smooth areas and edges. The smoothness engine 46 includes a neighbour contrast calculator, which is arranged to determine a smoothness factor of a block by counting the number of smooth pixels in the block $D_{b,u,v}$. A pixel is determined to be smooth if a sufficient number of its nearest neighbours are within a neighbourhood threshold of its own value. The smoothness factor of a block is then calculated as a function of the proportion of smooth pixels in the block. The neighbourhood threshold of pixel values, which is used to define whether a pixel is determined as being smooth, and the relationship between the smoothness factor and the compensation factor is determined empirically from an effect of combining code word coefficients with the image blocks with certain smoothness factors, as judged by the human eye.

Once the compensation factor has been calculated by the smoothness engine 46, these are received by a weighting factor combiner 58 and combined with the weighting factors generated by the contrast masking engine 44. The weighting factors are then fed to the strength adapter 24 as shown in FIG. 2.

As shown in FIG. 4, in some embodiments the perceptual analyser 14.1 may also include a perceptual weighting engine 60 and a temporal masking engine 62. The perceptual weighting engine 60 is arranged to generate an adjustment to the weighting factors generated by the contrast masking engine 44 and the smoothness masking engine 46 in accordance with a function based on the human visual system. Thus according to an empirically determined function derived from human perception adjustment factors are generated based on the source image in the spatial domain and combined with the weighting values generated by the contrast masking engine 44 and the smoothness compensation engine 46 by the combiner 58. Similarly the temporal masking engine 62 is arranged to generate an adjustment to the weighting factors generated by the contrast masking engine 44 and the smoothness masking engine 46 in accordance with temporal changes to the video images. Thus for example, at moments of scene change in the image, humans are less sensitive to noise and/or visual imperfections in the image. Accordingly watermark code word coefficients are introduced into video image after scene changes in the video images. Scene changes are therefore detected in the video source images in the spatial domain and combined with the weighting values generated by the contrast masking engine 44 and the smoothness compensation engine 46 by the combiner 58.

More Detailed Encoder Example

Figure 6:
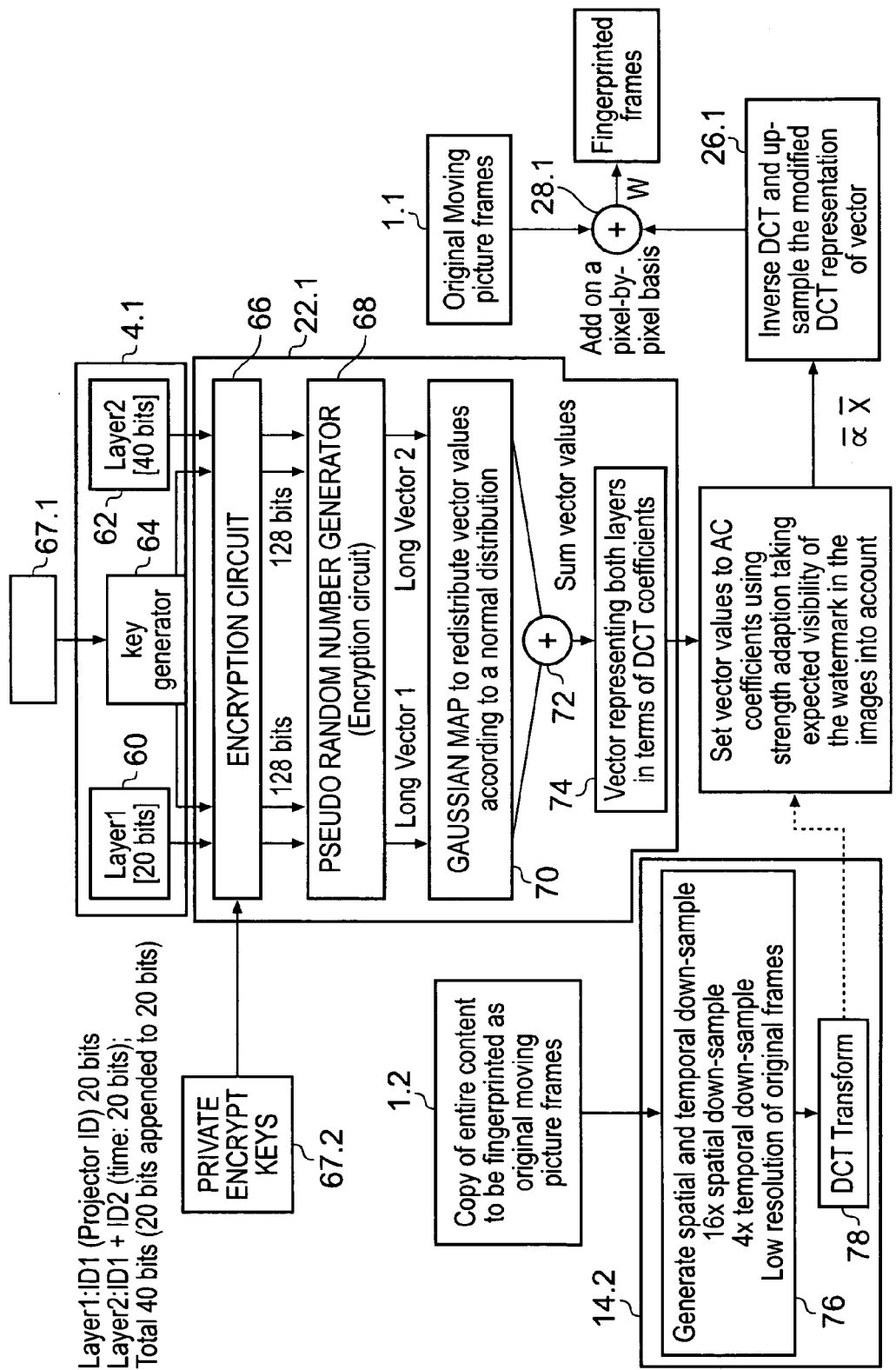
FIG. 6 is a schematic block diagram of a second example encoding apparatus for combining an image with a code word according to the present technique.

FIG. 6 provides a more detailed example of an encoding data processing apparatus which is arranged to embed a watermark code word into a copy of an information material item such as video images. The encoding data processing apparatus shown in FIG. 6 includes a payload data word generator 4.1 which is arranged to operate in accordance with co-pending UK patent application number 0327854.6 to generate a code word having at least two parts or layers to represent two fields of a payload data word. The code words are arranged to represent the two fields in a hierarchical manner with the effect that the first code word identifies the first data field, whereas the second code word identifies a value of the second data field conditioned on the first data field. As such a detected code word can be used to identify one of a plurality of sub-sets into which the data words are divided, each data word in the sub-set having the same value in the first field. A second or subsequent field of the data word from the sub-set can be then identified by detecting a second code word from the material item. The second code word identifies a value in the second data field as well as the value of the first data field. The arrangement of the data fields in association with the watermark code words uniquely identifies a layer hierarchy of data field values, which can be used to convey different types of information.

As shown in FIG. 6, the code word generator 4.1 includes a first layer data word generator 60 and a second data word generator 62. The first and second data word generators 60, 62 are arranged to generate respective data words which may in some applications be utilised to embed an identifier having a first part ID1 and a second part ID2. As explained in co-pending UK patent application number 0327854.6 two code words may be generated to represent payload data having at least two parts or layers. The code words are arranged to represent the two fields in a hierarchical manner with the effect that the first code word identifies the first data field, whereas the second code word identifies a value of the second data field conditioned on the first data field. The payload data may be an identifier, the first data field providing a first identifier ID1 which is represented by a first code word, whereas the first and second parts ID1+ID2 of the identifier may be represented by a second code word. As shown in FIG. 6, the first layer data word generator 60 generates the first layer data word ID1 of 20 bits, whereas the second layer data word generator 62 generates the second layer data word ID1+ID2 of 40 bits. The first layer data word represents the first part of the identifier ID1, whereas the second layer data word represents the first and second parts of the identifier ID1+ID2.

In a digital cinema application the first part of the identifier ID1 can represent the projector identifier whereas the second part of the identifier ID2 can represent a time, date or location at which the cinema film was displayed.

The data word generator 4.1 of the encoding data processor shown in a FIG. 6 also includes a key generator 64, which generates keys for generating the code words to represent the first and second data word layers. The key generator 64 generates two keys for the first and second layers, which are fed to an encryption circuit 66 forming part of a code word generator 22.1. The keys may be provided from an interface 67.1. The encryption circuit 66 receives first and second private encryption keys from a second interface 67.2 and encrypts the first and second data word layers in accordance with a private key encryption process to form first and second encrypted data word parts. In the example of FIG. 6, the first and second encrypted data words each comprise 128 bits. The first and second encrypted data words are received by a pseudo random number generator 68. The pseudo random number generator 68 also receives first and second keys from the key generator 64 which also comprise 128 bits. The pseudo random number generator uses the first and second encrypted data word layers as seeds to generate code word coefficients for each of two code words to represent the first and second data word layers. The first and second code words are then received by a Gaussian mapping processor 70 which is arranged to redistribute the coefficients of the first and second code words according to a normal distribution. The Gaussian distributed code words are then combined by a combiner 72 to form a composite code word 74. A vector representing both data word layers is thereby formed and passed from the code word generator 22.1 to the strength adapter 24.1.

In FIG. 6, a more simplified version of the perceptual analyser 14.2 shown in FIG. 4 is arranged to generate weighting factors for combination with the code word coefficients as explained for the perceptual analyser 14.1 of FIG. 4. However, the perceptual analyser 14.2 of FIG. 6 is shown as only including a spatial and temporal down-sampler 76, which is arranged to receive a copy of the base band source images and to form a low resolution version of the source images by spatial and temporal down-sampling. The low resolution image is then transformed into the DCT domain by a DCT transform processor 78 and fed to a strength adaptor and combiner 80.

The strength adaptor and combiner 80 adjusts the weight of the transform domain code word coefficients received from the code word generator 22.1. For the example shown in FIG. 6, the code word coefficients are adjusted with respect to an AC values of the DCT coefficients with respect to the DC value as explained with reference to the contrast masking engine 44 of the image perceptual analyser 14.1 of FIG. 4. In other embodiments the image perception anslyser 14.2 may include one or all of the smoothness compensation engine 46, the perceptual weighting engine 60 or the temporal masking engine 62.

The perceptually weighted code word coefficients are then formed into a DCT domain representation of the source image, to which the code word is to be embedded. The code word coefficients are then received by an inverse transformer 26.1 which operates as described above to perform an inverse DCT transform on the spatially and temporally down-sampled image, to convert the image into the spatial domain. The spatial domain down-sampled image is then spatially and temporally up-sampled to the base band domain. The marked copy of the images W are then formed by a combiner 28.2 which is arranged to add the spatial domain coefficients to the original images I, to form finger printed frames. The finger printed frames may then be for example projected such as in a digital cinema.

Detecting Processor

Figure 7:
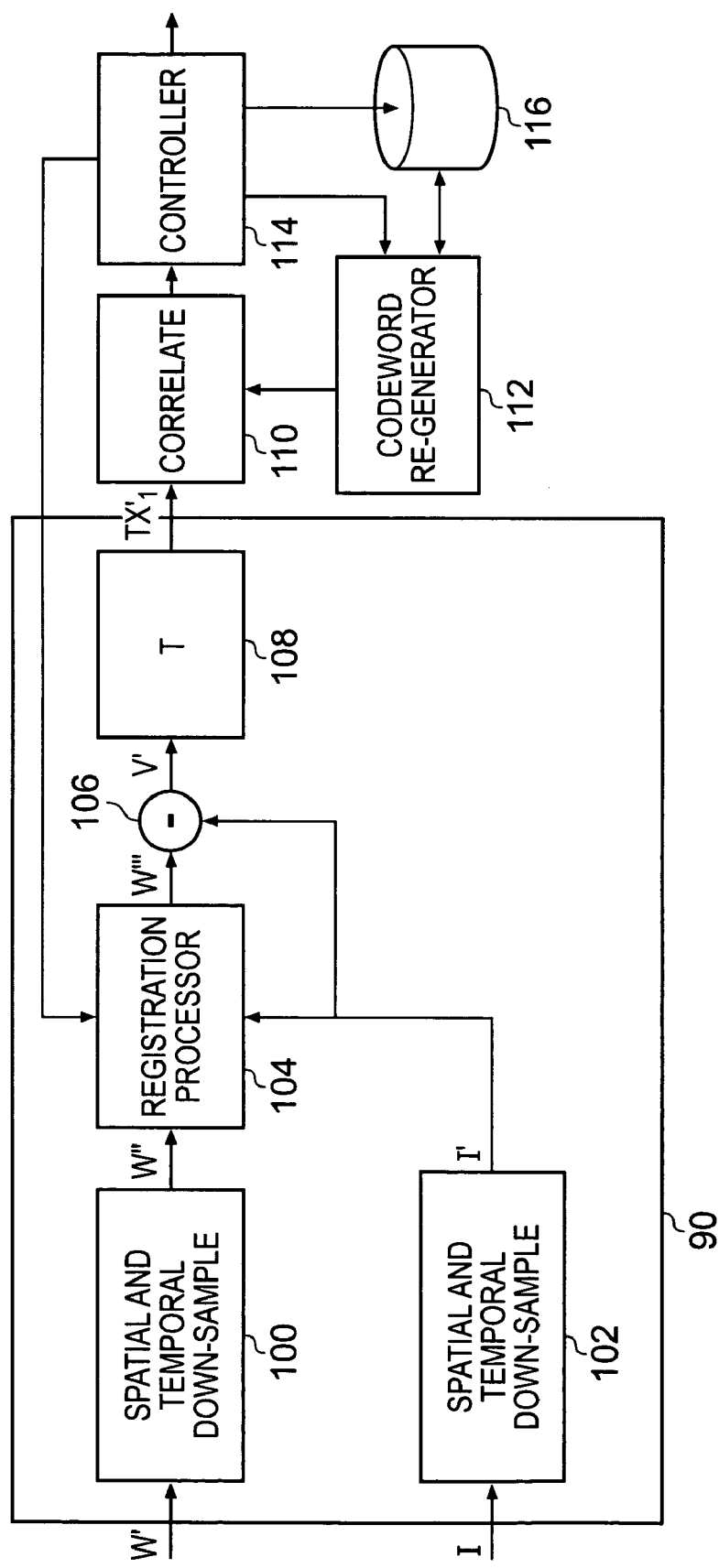
FIG. 7 is a schematic block diagram of a detecting data processing apparatus for detecting payload data represented by code words present in marked copies of images.

A detecting apparatus, which is arranged to detect code words and to recover a payload data word if present in the material item is shown in FIG. 7. In FIG. 7 an offending version of the watermarked image W' and a copy of the original image I are received in a recovery processor 90. Within the recovery processor 90, the marked image is received at a first down-sampling processor 100. The copy of the original image I is fed to a second down-sampling processor 102. The first and second down-sampling processors 100, 102 each spatially and temporally down sample the received images W', I to form reduced resolution versions. The reduced resolution versions correspond to the down-sampled version with respect to which the code word was formed in the transform domain, when embedded in the image I in the encoding data processor.

The recovery processor 90 is arranged to process the marked image and the original image and to form an estimate of a code word which may have been embedded in the marked image. For the example shown in FIG. 7, the recovery processor 90 also includes a registration processor 104, a comparator 106 and a transform processor 108.

The offending version of the image W' may have been produced by photographing or otherwise reproducing a part of the watermarked image W'. As such, in order to improve the likelihood of detecting the identification code word, the registration processor 104 is arranged to receive the down-sampled version of the image I' and the suspected marked copy W'' and to align substantially the offending image with the original version of the image. One example of a process for registering a received image with the original version of the image is provided in European patent application number 1 324 263 A. The purpose of this alignment is to provide a correspondence between the down-sampled original image samples I' and the corresponding samples of the down-sampled watermarked image W'' to which the code word coefficients have been added, thereby increasing a likelihood of correctly detecting a code word, or reducing the false negative detection.

The registered image W''' is received by the comparator 106 also forming part of the recovery processor 90. The comparator 106 also receives a copy of the down-sampled original image I' and proceeds to subtract the samples of the original image I' from the registered watermarked image W'''. Since the watermark code word was embedded into the image I' in the spatial domain there is no requirement to transform the image into the frequency domain to recover an estimate of the watermark code word V' The estimate of the code word V' in the spatial domain is then fed to the transform processor 108 which forms an estimate of the code word by performing a DCT on the reduced resolution samples to form an estimated code word X'.

The output of the transform processor 108 therefore provides an estimate of the coefficients of the code word, which is to be identified. The recovered code word X' is then fed to a first input of a correlator 110. The correlator 110 also receives on a second input a re-generated code words $X^i$ produced by the code word generator 112. The code word generator 112 operates to reproduce code words under the control of a control processor 114. The control processor 114 therefore has access to a data store 116, which stores seeds and keys for generating the watermark code words. The control processor 114 controls the correlator 110 and the code word re-generator to correlate, with the estimated code word, each of the code words in the set of possible code words, which may have been embedded in the image. If a result of the correlation exceeds a predetermined threshold then the control processor 114 determines that the code word was present in the estimated code word and accordingly the corresponding payload data word layer or identifier ID1, ID2 is considered to have been detected.

According to the present technique the detecting data processor illustrated in FIG. 7 is arranged to identify the payload data word having first and second layer parts to recover the identification data ID1, ID2. An advantage is provided by the decoder according to the present technique in that most of calculations and processing performed by the detecting data processor are performed on a down-sampled version of samples corresponding to the original base band image from which the estimated code word is recovered. That is, the DCT transform and correlation of the re-generated code words with the estimated version of the code word are performed on a down sampled version of recovered samples of the code word. As can be appreciated, for the example application of digital cinema, the source images may comprise 4096×2048 pixels each pixel having 12 bit samples. For this example the down sampling may reduce the size of the images to be decoded to, for example 256×128 pixels each having 8 bit samples. Accordingly, a substantial reduction in the amount of processing which is required to detect and recover an estimate of the code word is provided.

Applications

The encoding image processing apparatus which is arranged to produce the watermarked images shown in FIG. 2 may be incorporated into a variety of products for different scenarios in which embodiments of the present invention find application.

In one application the encoding image processor forms part of a digital cinema projector in which the payload data is added during projection of the image at, for example, a cinema Thus, the code word is arranged to identify the projector and the cinema at which the images are being reproduced.

Figure 8:
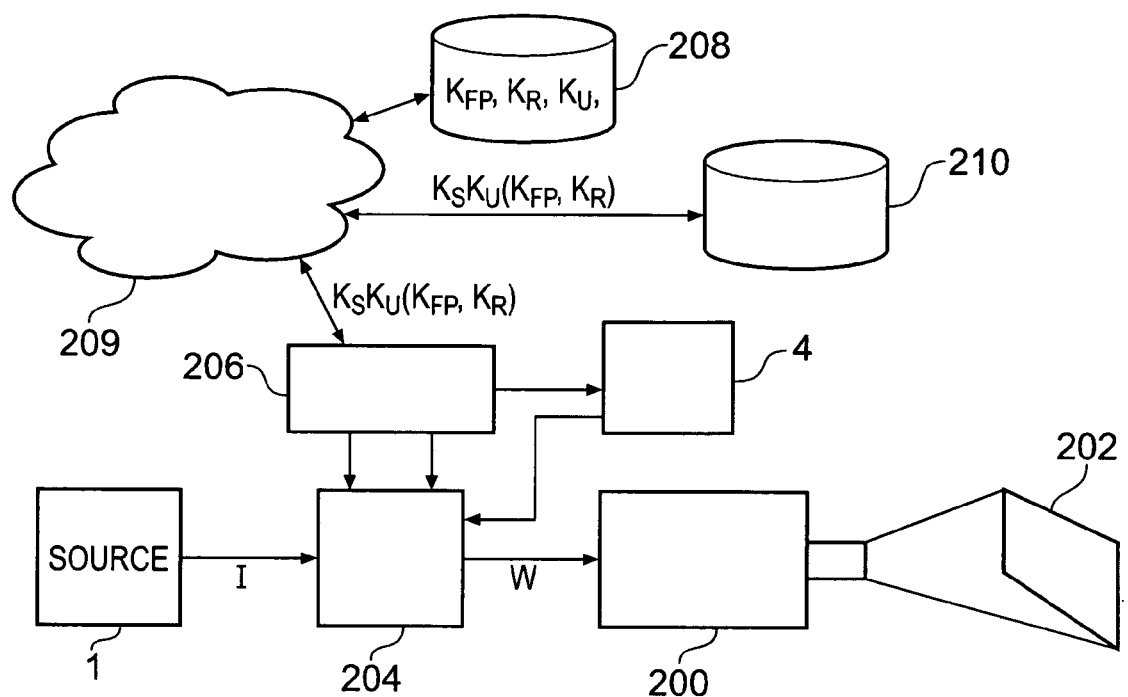
FIG. 8 is a schematic block diagram of system for distributing finger print keys for marking images when reproduced by a display device.

FIG. 8 provides a schematic block diagram of a system in which watermarked images are generated for display for example in a digital cinema In FIG. 8 a display device 200 is shown to project a watermarked image W onto a screen 202. The watermarked image is generated from a source 1 in an original form and fed to an encoding data processor 204. The encoding data process of 204 corresponds for example to the encoding data processing apparatus shown in FIG. 6. As illustrated in FIG. 6 the code word is generated to represent payload data which may have one or more layers providing first and second identifiers ID1, ID2. Each of these layers is encrypted with a private key by the encryption circuit 66. The encrypted payload data is then used as a seed for pseudo random number generator 68. Pseudo random number generator generates the code word coefficients which are combined with the source image in the spatial domain to form the watermarked image W. As shown in FIG. 8 the finger print key and the encryption key for the payload data are provided by a secure interface 206.

As illustrated in FIG. 8 the payload data or at least part of the payload data is provided by the payload generator 4. Some of the data for the identifiers forming the payload data may be provided by the secure interface 206. The secure interface 206 is arranged to receive a finger print encryption key $K_{fp}$ and a private encryption key for the payload data $K_r$ via a secure link from a secure server 208. Communication of the finger print key $K_{fp}$ and the payload encryption key $K_r$ is provided by a public key encryption using a public key $K_u$ in combination with a secret key $K_s$. The public key $K_u$ and secret key $K_s$ can be used to authenticate the secure interface 206 and the secure server 208 in order to provide an authentication certificate for receipt and acknowledgement of the finger print key $K_{fp}$ and the payload encryption key $K_r$. In some embodiments the encoding apparatus 204, the secure interface 206 and the data word generator 4 may form a separate media terminal for receiving the finger print encryption key $K_{fp}$ and the payload encryption key $K_r$. In other embodiments the source 1, the encoding apparatus 204 the secure interface 206 and the data word generator 4 maybe integrated within the display device 200.

According to the digital cinema standard the cinema film is received in encoded form of the JPEG2000 and decoded to reproduce the cinema images to be projected. Signals representing the cinema image are therefore fed to the media terminal in which the code words are introduced before the water marked images are projected onto a cinema display screen.

In some embodiments the finger print key $K_{fp}$ and the payload encryption key $K_r$ may be provided via a licensing server 210 in accordance with a contractual arrangement for displaying images. For example, a third party may be permitted to display film images at only a certain a cinema and provided certain contractual conditions have been satisfied.

In some embodiments the licensing server 210 may also provide an identifier data over the secure link to the secure interface 206 which is to be included in the payload data word associated with a code word combined with the images to form the watermarked images. In one example the data provided by the licensing server identifies uniquely the display apparatus 200 which is to receive the finger print key $K_{fp}$ and the encryption key $K_r$. The data may also identify a time and day on which the images are to be reproduced and accordingly the secure interface 206 may disable reproduction of the images if the time and date does not correspond with the agreed time limit date allocated by the licensing server 210.

Figure 9:
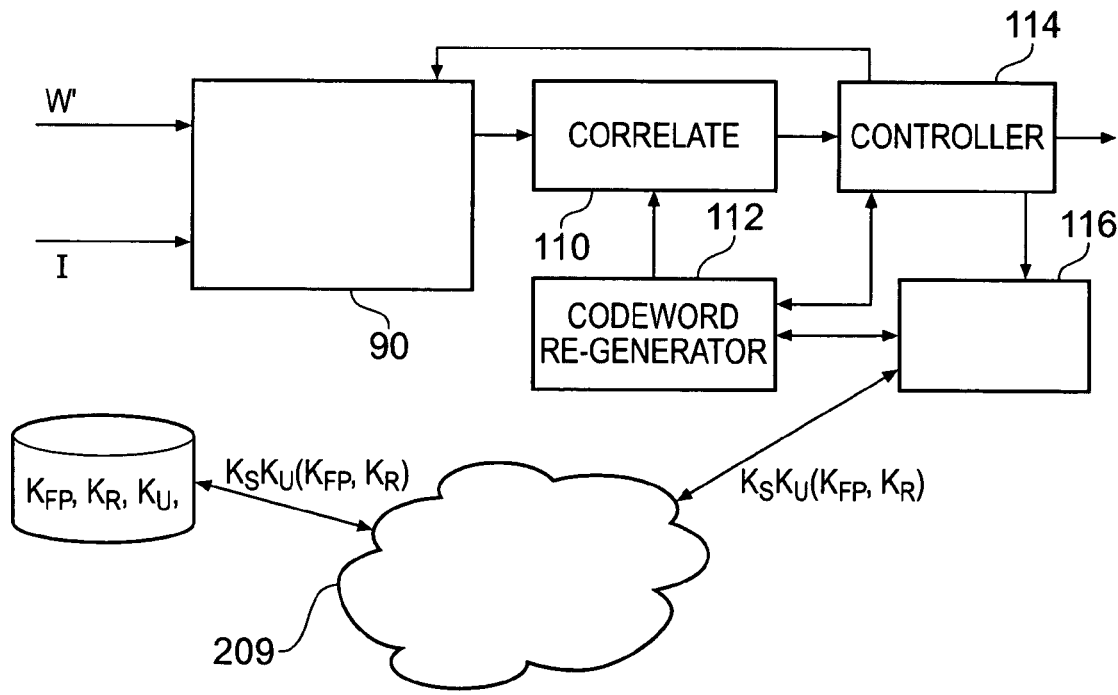
FIG. 9 is a schematic block diagram of a detecting data processing apparatus for detecting payload data represented in marked images produced by the system illustrated in FIG. 8.

A detecting data processing apparatus for detecting and identifying the payload data to the effect of determining when and where the source images were reproduced by the display apparatus shown in FIG. 8 is provided in FIG. 9. The detecting data processing apparatus corresponds to the detecting data processing apparatus illustrated in FIG. 7 and so respective parts having common numerical reference numerals already appearing in FIG. 7 above will not be explained for FIG. 9 to reduce repetition. As shown in FIG. 9 the key store 116 which is shown in FIG. 7 has been replaced by a secure interface 116.1 in FIG. 9. The finger print encryption key $K_{fp}$ and the payload encryption key $K_r$ are provided to the secure interface 116 for regenerating the code words within the code word regenerator 112 from the secure server 208. As before a secure link is provided via the internet 209 using public key encryption using the public key $K_u$ and the secret key $K_s$ which is provided to the secure interface 116.1. The operation of the detecting apparatus is the same as that of the data processing apparatus presented in FIG. 7.

Further Example Encoding Apparatus

Figure 10:
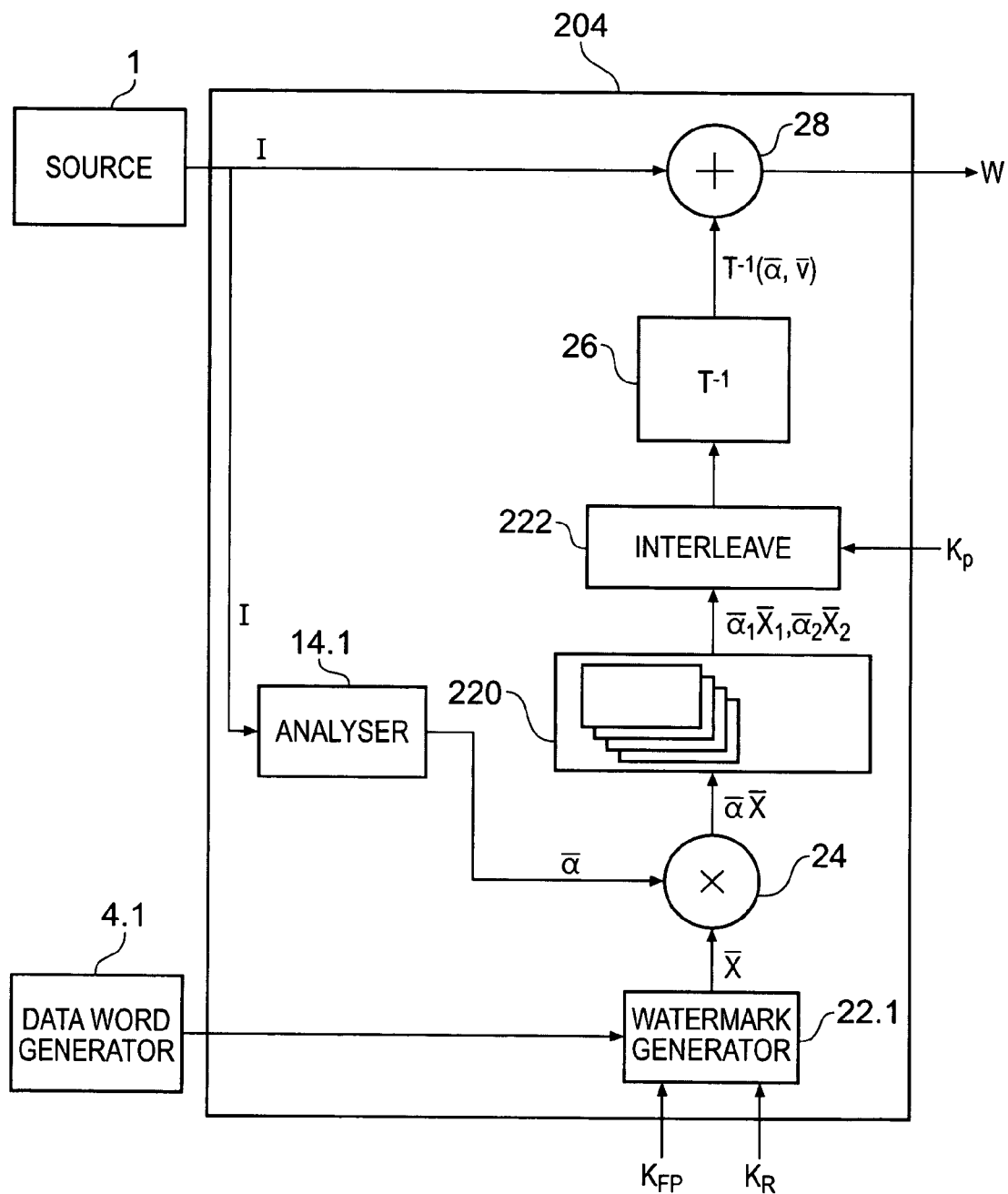
FIG. 10 is a schematic block diagram of another example encoding data processing apparatus according to the present technique.

FIG. 10 provides a further example embodiment of an encoding data processing apparatus utilising the present technique. The encoding data processing apparatus shown in FIG. 10 corresponds substantially to encoding apparatus shown in FIG. 2 and so parts having the same numerical references operate in substantially the same way and so further explanation will not be repeated here.

As shown in FIG. 10 the encoding apparatus 204 receives the finger print encryption key $K_{fp}$ and the payload encryption key $K_r$ within the watermark generator 22.1. The watermark generator 22.1 corresponds substantially to the watermark generator 22.1 shown in FIG. 6. However, in contrast to the encoding apparatus shown in FIG. 6, the encoding apparatus shown in FIG. 10 includes a code word dividing processor 220 and an interleaver 222. In order to improve the likelihood of detecting a code word within a watermarked image, the encoding apparatus shown in FIG. 10 divides a watermark code word into a number of parts. For example, if the code word is represented as 512 bits (providing a 300 bit digital signature in combination with 212 payload data bits) the code word is divided into 64 bits (each bit represents a coefficient of the code word). Each of the 64-bit sections is encoded separately into one image frame. Each image frame is fed to the inverse transform processor, inverse DCT transformed and up-sampled to be combined with a frame from the image source. However, to improve security, the code word coefficients are interleaved in accordance with an interleave key $K_p$. The interleaving is performed by the interleaver 222 to the effect of performing a random selection of different code word coefficients. Therefore, for the example illustrated in FIG. 10, the 512 bits of the code word are distributed over eight image frames with 64-bits provided per frame. Each of the coefficients is interleaved by the interleaver 222 in order to improve security.

Figure 11:
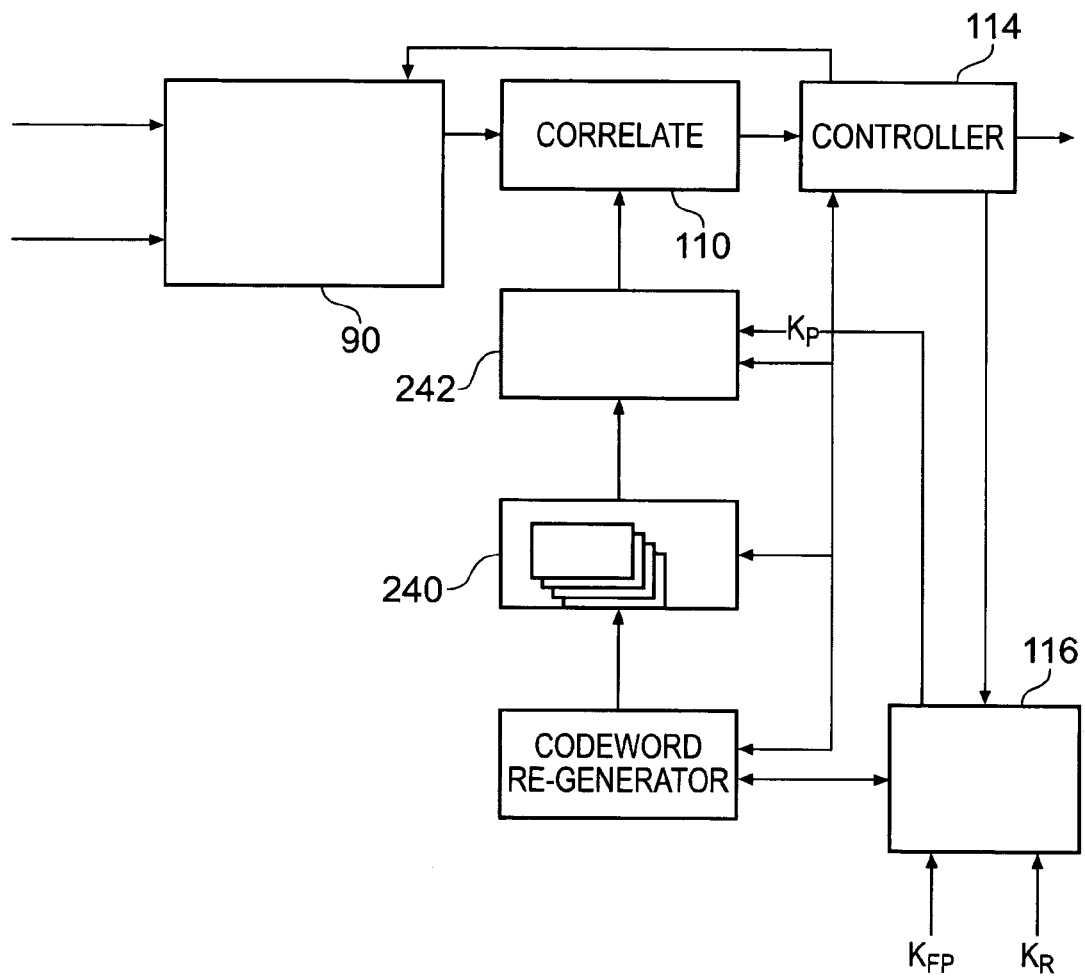
FIG. 11 is a schematic block diagram of a detecting data processing apparatus for detecting payload data represented in marked images produced by the encoding apparatus illustrated in FIG. 10.

A corresponding detecting data processing apparatus is shown in FIG. 11. The data processing apparatus shown in FIG. 11 corresponds to the data processing apparatus shown in FIGS. 7 and 14 and so only parts which differ from the data processing apparatus shown in these Figures will be explained. In order to correspondingly detect a code word, which has been divided into separate parts and distributed over separate frames, the detecting data processing apparatus includes a corresponding code word dividing apparatus 240 and an interleaver 242. Therefore, the re-generated code word received from the code word generator to 112 is divided into separate parts in correspondence with the division performed at the encoding apparatus. Each part is then correlated separately after being correspondingly interleaved by the interleaver 242 and correlated with each code word part recovered from a corresponding frame. Each sub-correlation is then summed to provide an overall correlation result for the code word concerned, therefore providing the controller with an indication of whether the code word was present in the watermarked image.

Summary of Operation

Figure 12:
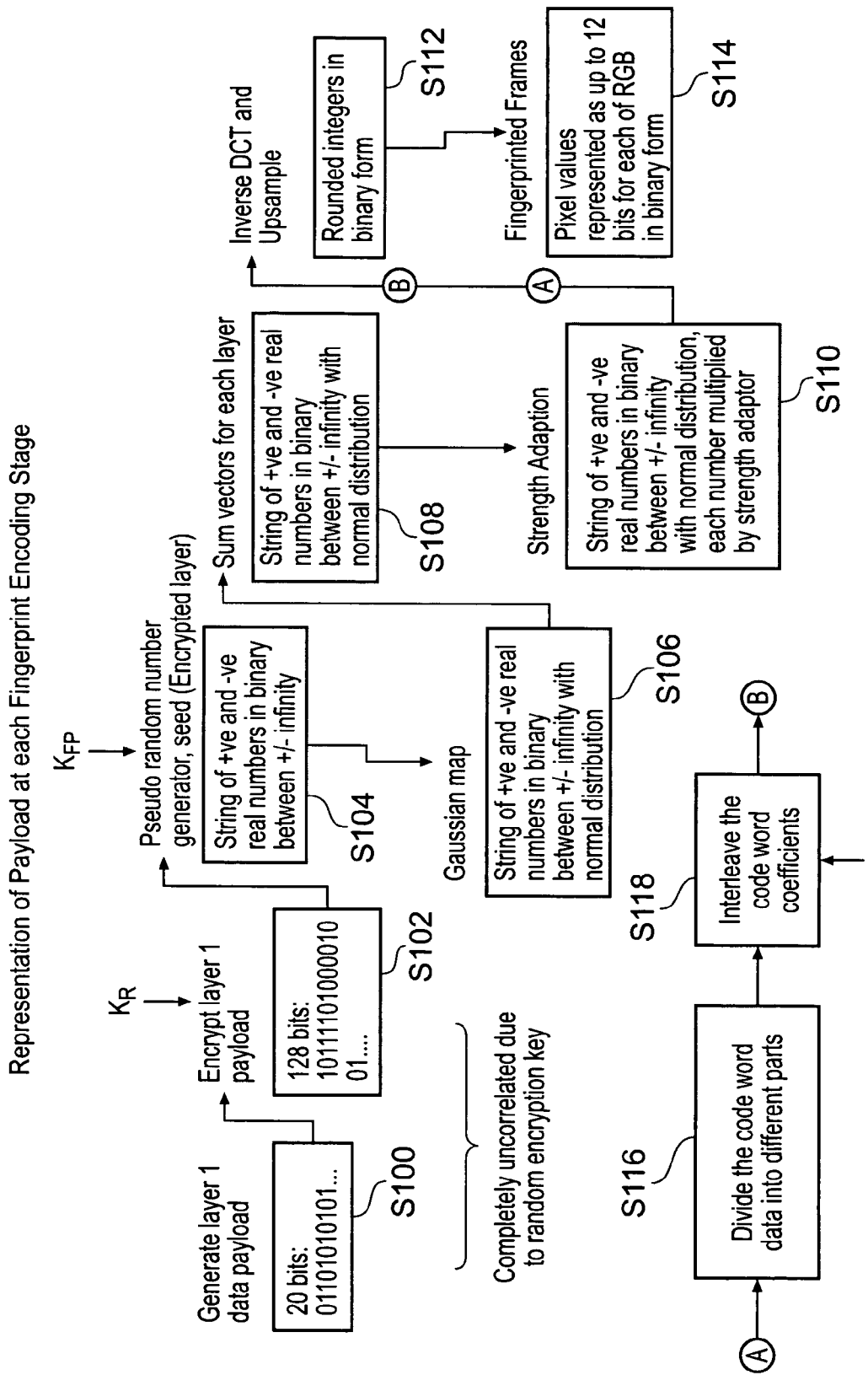
FIG. 12 is a flow diagram illustrating the operation of the encoding data processing apparatus which is shown in FIGS. 6 and 8.

FIG. 12 provides a flow diagram illustrating processing involved in generating a watermark code word which is then combined with a plurality of image frames to form a watermarked image. The flow diagram on FIG. 12 is summarised as follows:—

S100: The first layer of the data payload ID1 is generated. The first layer may comprise, for example, 20 bits. In some embodiments the first layer may be an authenticated identifier provided from the secure server by the secure link.

S102: The first layer payload is then encrypted using the private payload encryption key $K_r$ to generate 128 bits.

S104: The encrypted layer ID1 payload is then fed to the pseudo random number generator which uses the payload as a seed to generate the code word coefficients using the finger print key $K_{fp}$. The code word coefficients comprise a string of positive and negative random numbers.

S106: The code word coefficients are then mapped in accordance with a Gaussian mapping to distribute the coefficients in accordance with a normal distribution.

S108: The code word coefficients for each layer are combined to form composite code word coefficients.

S110: The strength of the code word coefficients is then adapted by combining the code word coefficients with weighting factors calculated by an image perceptual analyser.

S112: The code word is then inverse transformed to the spatial domain by performing a inverse DCT and by up-sampling to the sampling rate of the base band image.

S114: The spatial domain code word is then combined with the pixel values of the image to the effect of representing as much as 12 bits for each of the red, green and blue components.

Optionally as indicated for the encoder illustrated in FIG. 10 further steps may be provided between steps 110 and S112 which are shown in FIG. 12 as steps 116 and 118 and are summarised as follows:—

S116: The code word is divided into different parts for combining with a plurality of frames. The code word is divided equally into separate parts each part to be combined with a separate image frame.

S118: The code word coefficients for each part are interleaved in accordance with an interleave key Kp.

Figure 13:
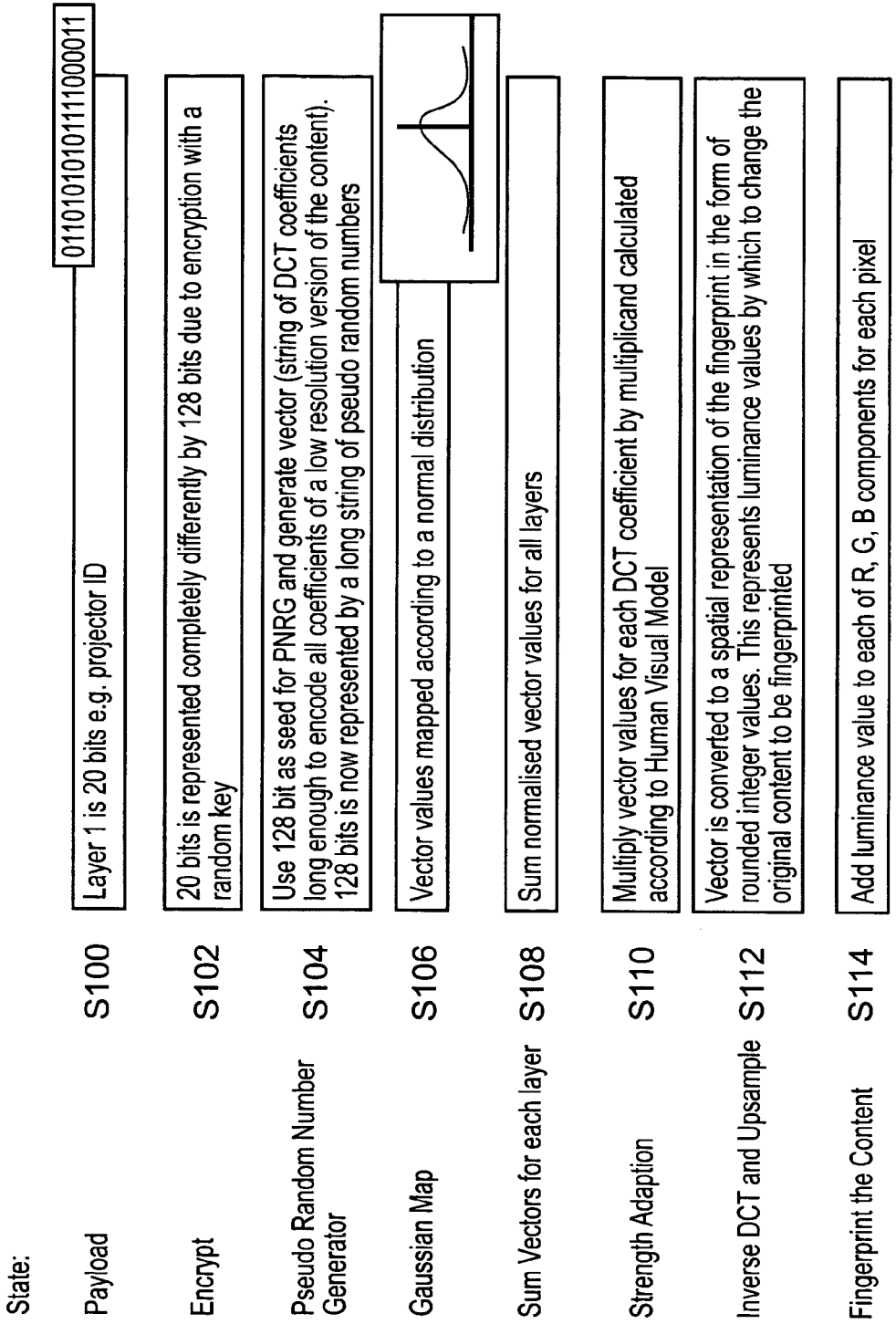
FIG. 13 is a diagram presenting a summary of the form of the state of signals formed by the process illustrated by the flow diagram of FIG. 12.

A diagram presenting a table of the form of the payload data as it is represented as a code word and used to form a watermark image as produced by the process illustrated in FIG. 12 is summarised in FIG. 13. Reference numerals are provided in FIG. 13 in correspondence with the process steps illustrated in FIG. 12.

Figure 14:
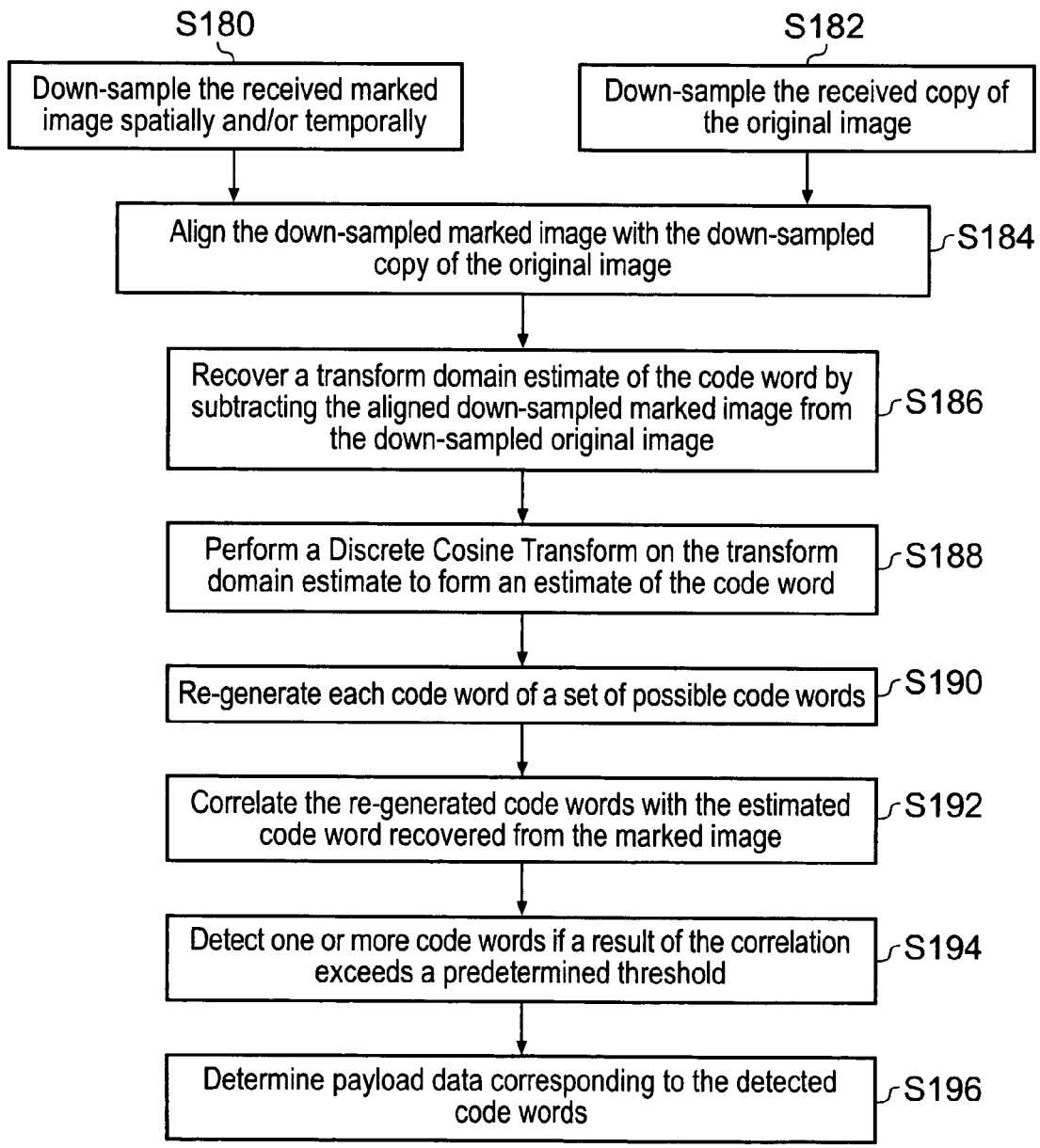
FIG. 14 is a flow diagram illustrating a process for detecting a payload data word from a marked image according to the present technique.

As will be appreciated a detecting process can be formed correspondingly in which the code words are re-generated as illustrated for the process steps shown in FIG. 12. A flow diagram illustrating a process performed in detecting a code word from which payload data can be recovered is illustrated in FIG. 14. The steps illustrated in FIG. 14 are summarised as follows:—

S180: The marked image from which the payload data is to be recovered is received and spatially and/or temporarily down-sampled in correspondence with a temporally and/or spatially down-sampled domain in which the code word was formed.

S182: A copy of the original image is received and correspondingly spatially and/or temporarily down-sampled, the down-sampling corresponding to the down-sampling performed on the marked image.

S184: A registration process is performed with the effect that the down-sampled marked image is aligned with the down-sample copy of the original image. Alignments is effected so that as far as possible samples to which code word coefficients were added in the original copy of the image correspond to the samples of the down-sampled copy of the image received at the detector. A result of the alignment should therefore increase a likelihood of correctly recovering the code word and detecting the payload data.

S186: A transform domain estimate of the code word is recovered by subtracting the aligned down-sampled marked image from the down-sampled original image. At this point the samples are still in the spatial domain.

S188: A DCT is performed on the transform domain estimate to form an estimate of the code word. As will be appreciated DCT is one example of the transform, which could be used.

S190: Code words from the set of possible code words are regenerated. To generate a particular code word the code word re-generator requires the finger print encryption key $K_{fp}$ as well as the private and payload key $K_r$. Therefore, the process steps S100 to S108 are performed to re-generate each code word.

S192: The regenerated code words are correlated with the estimated code word recovered from the marked image.

S194: One or more code words are detected if a result of the correlation exceeds a predetermined threshold. In the controller the result of each correlation of each respective part of the re-generated code word is summed to provide an overall correlation result from the complete code word.

S196: The payload data is determined from the code words which are detected by the correlation results.

Various further aspects and features of the present invention are defined in the appended claims. Various modifications can be made to the embodiments herein before described without departing from the scope of the present invention.

The invention claimed is:

1. An encoding data processing apparatus for generating a marked copy of an item of material by introducing a code word into a copy of the material item, the code word being uniquely associated with a payload data word, the apparatus comprising:
    an encryption circuit, including a processor, configured to receive a payload encryption key and to receive the payload data word, and to encrypt the payload data word using the payload encryption key;
    a pseudo random number generator configured to receive the encrypted payload data and a finger print key and to generate the code word having a plurality of code word coefficients using the encrypted payload as a seed for the pseudo random number generator and the finger print key; and
    a combiner configured to combine the code word with the material to form the marked copy of the material item.

2. The encoding data processing apparatus as claimed in claim 1, wherein the payload data word has at least two fields, and the encryption circuit is configured to encrypt each data field, the pseudo random number generator is configured to receive, for each data field, the encrypted payload data and a finger print key and to generate for each data field a plurality of code word coefficients using the encrypted payload as a seed for the pseudo random number generator and the finger print key for the data field, the apparatus comprising a code word forming combiner which is configured to form the code word by combining each of the plurality of code word coefficients generated for each payload data field.

3. The encoding data processing apparatus as claimed in claim 1, further comprising a code word dividing processor configured to divide the code word into a plurality of parts, wherein the combiner is configured to combine each part of the code word into a different part of the material item.

4. The encoding data processing apparatus as claimed in claim 3, further comprising an interleaver configured to receive an interleave key and to receive each part of the code word and to interleave the code word coefficients within the part in accordance with the interleave key.

5. A media terminal configured to form a marked copy of an item of material for reproduction by introducing a code word into a copy of the material item, the code word being uniquely associated with a payload data word, the terminal comprising:
    a secure interface configured to receive a finger print key, and a payload encryption key; and
    an encoding data processing apparatus comprising
        an encryption circuit, including a processor, configured to receive the payload data word, and to encrypt the payload data word using the payload encryption key;
        a pseudo random number generator configured to receive the encrypted payload data and to generate a code word having a plurality of code word coefficients using the encrypted payload as a seed and the finger print key; and
        a combiner configured to combine the code word with the image to form the marked copy of the image.

6. The media terminal as claimed in claim 5, wherein the payload data word has at least two fields, and the encryption circuit is configured to encrypt each data field, the pseudo random number generator is configured to receive, for each data field, the encrypted payload data and a finger print key and to generate for each data field a plurality of code word coefficients using the encrypted payload as a seed for the pseudo random number generator and the finger print key, the encoding data processing apparatus comprising a code word forming combiner which is configured to form the code word by combining each of the plurality of code word coefficients generated for each payload data field.

7. The media terminal as claimed in claim 5, wherein the secure interface is configured to receive an interleave key, and the encoding data processing apparatus includes a code word dividing processor configured to divide the code word into a plurality of parts, and an interleaver configured to receive the interleave key and to receive each part of the code word and to introduce the code word coefficients within the part in accordance with the interleave key, wherein the combiner is configured to combine each part of the code word into a different part of the material item.

8. The media terminal as claimed in claim 5, further comprising a payload generating processor configured to generate at least one field of the payload data word.

9. The media terminal as claimed in claim 8, wherein one of the data field identifies at least one of a time, date or a location of reproduction of the material item.

10. The media terminal as claimed in claim 5, wherein the secure interface includes an encryption processor having a public key and a secret key pair, the secure interface receiving the finger print key and the payload encryption key from a secure server, the finger print key and the payload encryption key having been encrypted using the public key, the secure interface being configured to decrypted the finger print key and the payload key using the secret key.

11. The media terminal as claimed in claim 10, wherein the secure interface is arranged to receive an identifier identifying the media terminal from the secure server, the identifier having been encrypted using the public key, the secure interface decrypting the identifier using the secret key, wherein the identifier is used to form one of the data fields of the payload data.

12. The media terminal as claimed in claim 11, wherein at least one of the identifier of the media terminal, the finger print key and the payload encryption key are received by the media terminal following an exchange of an authentication certificate generated using the public key.

13. A system for providing secure marking of images for reproduction, the system comprising:
a secure server configured to provide finger print keys and payload encryption keys, via a secure link, and
a media terminal according to claim 5, the media terminal including a secure interface having an encryption processor configured to encrypt and de-crypt the finger print keys and the payload encryption keys received from the secure server using a public key and a secret key pair, the encryption and the decryption providing the secure link.

14. The system as claimed in claim 13, further comprising a licensing server, the licensing server being configured to provide licensing data indicating a time and date for reproduction of the material items, and in combination with the secure server to provide via the secure link the licensing data with the finger print key and the payload encryption key, wherein the media terminal is arranged to inhibit reproduction of the material item if the time and date provided with the licensing data is not consistent with a time and date provided by a payload generating processor in the media terminal.

15. The cinema projector including a media terminal according to claim 5, and a source generator configured to generate signals representing cinema video images for display, and a display device configured to receive the cinema signals and to display the signals, wherein the signals are received by the media terminal and marked with at least one code word before being received by the display device for display.

16. A detecting data processing apparatus configured to determine a payload data word from a marked copy of a material item, the material item having been marked with at least one code word, the code word being from a set of possible code words generated by a pseudo random number generator from a set of possible finger print keys and an encrypted version of the payload data word as a seed for the pseudo random number generator, the payload having been encrypted using a payload encryption key, the detecting apparatus comprising:
a secure interface configured to receive the finger print keys for generating the set of code words and the payload encryption key via a secure link;
a recovery processor, including a processor, configured to recover an estimate of at least one code word by comparing the marked version of the material item with the original version of the material item;
a code word re-generator configured to re-generate code words from the set of code words using the set of finger print keys and encrypting a suspected payload data word using the payload encryption key;
a correlator configured to correlate the estimated code word recovered from the marked image with a code word regenerated by the code word re-generator; and
a control processor configured to control the code word re-generator to re-generate code words from the set of code words, to control the correlator to correlate the re-generated code words with the estimated code word recovered from the marked image, to determine whether a code word has been detected if a result of the correlation from the correlator exceeds a predetermined threshold, and to detect the payload data word in accordance with the detected code word.

17. The detecting data processing apparatus as claimed in claim 16, wherein the marked material item has been formed by dividing the code word into a plurality of parts and combining each code word part with a separate part of the material, the code word coefficients of each code word part having been interleaved in accordance with an interleave key before being combined, the detecting data processing apparatus comprising a code word dividing processor configured to divide each re-generated code word into a plurality of parts, and an interleaver configured to receive the interleave key and to receive each part of the code word and to interleave the code word coefficients within the part in accordance with the interleave key, wherein the controller is configured to control the correlator to correlate each part of the code word with a different part of the material item, and to combine a result of the correlation for each code word part to form a total correlation result, the total correlation result being compared with the threshold to detect a code word.

18. A method of generating a marked copy of an item of material by introducing a code word into a copy of the material item, the code word being uniquely associated with a payload data word, the method comprising:
receiving a payload encryption key;
encrypting, using a processor, the payload data word using the payload encryption key;
receiving a finger print key, using a pseudo random number generator to generate the code word having a plurality of code word coefficients from the encrypted payload as a seed for the pseudo random number generator and the finger print key; and
combining the code word with the material to form the marked copy of the material item.

19. The method as claimed in claim 18, further comprising:
communicating the payload encryption key and the finger print key from a secure server to a media terminal for forming the marked material item and for reproducing the material item, the communicating comprising encrypting the payload encryption key and the finger print key with a public encryption key, and
de-crypting the payload encryption key and the finger print key with the public encryption key and a secret key forming a public encryption key pair.

20. A method of detecting a payload data word from a marked copy of a material item, the material item having been marked with at least one code word, the code word being from a set of possible code words generated by a pseudo random number generator from a set of possible finger print keys and an encrypted version of the payload data word as a seed for the pseudo random number generator, the payload data word having been encrypted using a payload encryption key, the method comprising:
receiving the finger print keys for generating the set of code words and the payload encryption key via a secure link;
recovering, using a processor, an estimate of the code word from the marked material item by comparing the marked version of the material item with an original version of the material item;
encrypting a suspected payload data word using the payload encryption key, re-generating code words from the set of code words using the encrypted suspected payload data word as a seed for a pseudo random number generator and using one of the set of finger print keys for each code word re-generated;
correlating the estimated code word recovered from the marked image with a re-generated code word; and
determining whether a code word has been detected if a result of the correlation from the correlator exceeds a predetermined threshold, and recovering the payload data in accordance with the detected code word.

21. A non-transitory computer readable medium bearing computer program code, which when loaded onto a data processor performs the method according to claim 18.

22. An apparatus for generating a marked copy of an item of material by introducing a code word into a copy of the material item, the code word being uniquely associated with a payload data word, the apparatus comprising:

- means for receiving a payload encryption key;
- means for encrypting the payload data word using the payload encryption key;
- means for receiving a finger print key;
- means for using a pseudo random number generator to generate the code word having a plurality of code word coefficients from the encrypted payload as a seed for the pseudo random number generator and the finger print key; and
- means for combining the code word with the material to form the marked copy of the material item.

23. An apparatus for detecting a payload data word from a marked copy of a material item, the material item having been marked with at least one code word, the code word being from a set of possible code words generated by a pseudo random number generator from a set of possible finger print keys and an encrypted version of the payload data word as a seed for the pseudo random number generator, the payload data word having been encrypted using a payload encryption key, the apparatus comprising:

- means for receiving the finger print keys for generating the set of code words and the payload encryption key via a secure link;
- means for recovering an estimate of the code word from the marked material item by comparing the marked version of the material item with an original version of the material item;
- means for encrypting a suspected payload data word using the payload encryption key;
- means for re-generating code words from the set of code words using the encrypted suspected payload data word as a seed for a pseudo random number generator and using one of the set of finger print keys for each code word re-generated;
- means for correlating the estimated code word recovered from the marked image with a re-generated code word; and
- means for determining whether a code word has been detected if a result of the correlation from the correlator exceeds a predetermined threshold, and means for recovering the payload data in accordance with the detected code word.

* * * * *